(12) United States Patent
Schürmann

(10) Patent No.: US 11,072,210 B2
(45) Date of Patent: Jul. 27, 2021

(54) PNEUMATIC VEHICLE TYRES

(71) Applicant: Continental Reifen Deutschland GmbH, Hannover (DE)

(72) Inventor: Oliver Schürmann, Langenhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 284 days.

(21) Appl. No.: 15/752,755

(22) PCT Filed: Apr. 12, 2016

(86) PCT No.: PCT/EP2016/057967
§ 371 (c)(1),
(2) Date: Feb. 14, 2018

(87) PCT Pub. No.: WO2017/028964
PCT Pub. Date: Feb. 23, 2017

(65) Prior Publication Data
US 2018/0244114 A1    Aug. 30, 2018

(30) Foreign Application Priority Data

Aug. 18, 2015 (DE) ...................... 10 2015 215 739.3

(51) Int. Cl.
*B60C 19/00* (2006.01)
*B60C 5/00* (2006.01)
(52) U.S. Cl.
CPC ............ *B60C 19/002* (2013.01); *B60C 5/002* (2013.01)
(58) Field of Classification Search
CPC ...... B60C 19/002; B60C 19/00; B60C 19/122
See application file for complete search history.

(56) References Cited

U.S. PATENT DOCUMENTS 6,102,082 A    8/2000  Hehle et al.
2003/0020320 A1*  1/2003  Yukawa ................. B60B 21/12
                                                          301/6.91

(Continued)

FOREIGN PATENT DOCUMENTS

DE          19806953 A1    8/1999
DE       102007028932 A1   12/2008

(Continued)

OTHER PUBLICATIONS

International Search Report dated Jul. 5, 2016 of international application PCT/EP2016/057967 on which this application is based.

*Primary Examiner* — Katelyn W Smith
*Assistant Examiner* — Cedrick S Williams
(74) *Attorney, Agent, or Firm* — David L. Cate; Gregory Adams

(57) ABSTRACT

A pneumatic vehicle tire (1) having a profiled tread (2) that merges at either side into sidewalls (3), the end of which is formed by a tire bead (5, 6) insertable in an airtight manner into a wheel rim (7) of a vehicle wheel (8), wherein an absorber (10) has been integrated into the pneumatic vehicle tire (1) for sound absorption and the cohesive bond consists of an adhesion promoter (11) applied between the absorber (10) and the inner surface (9) of the pneumatic vehicle tire (1), has been further developed in accordance with the invention in that the inner surface (9) of the pneumatic vehicle tire (1) has mutually alternating adhesion promoter sections (12) and adhesion promoter-free sections (13), the adhesion promoter-free sections (13) having been coated with a separating agent (14).

11 Claims, 2 Drawing Sheets

(56) References Cited

U.S. PATENT DOCUMENTS

Figure 1:
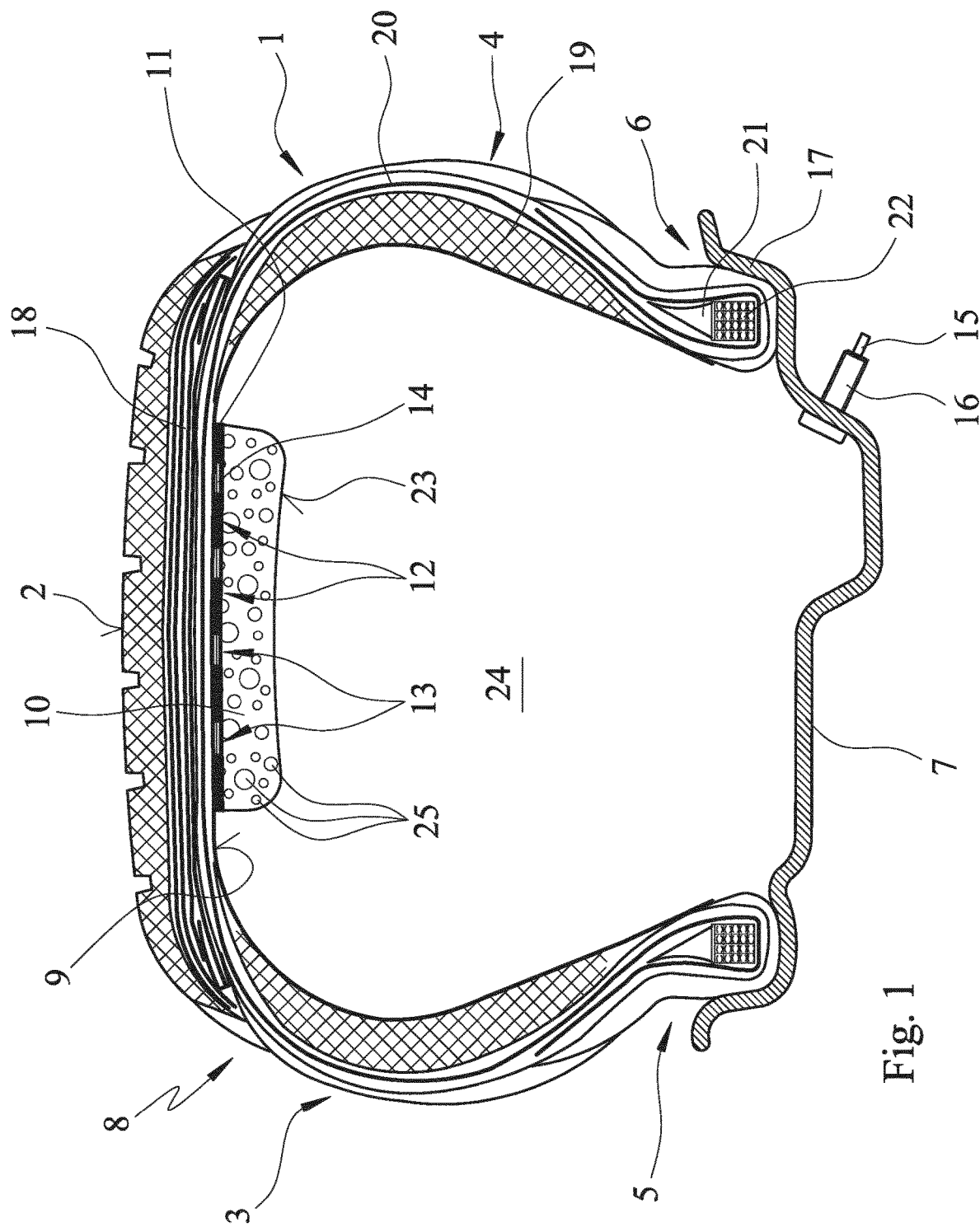

2008/0190550  A1      8/2008  Groppe et al.
2013/0032262  A1 *   2/2013  Bormann .............. C09J 175/04
                                                                     152/450
2014/0014248  A1      1/2014  Parfondry et al.

FOREIGN PATENT DOCUMENTS

| DE | 102011053686 A1 | 3/2013 | |
|----|----|----|----|
| EP | 1243212 A2 | 9/2002 | |
| JP | 2005104314 A | 4/2005 | |
| JP | 2005262920 A | 9/2005 | |
| JP | 2013032009 A | 2/2013 | |
| WO | 2003103989 | 10/2005 | |
| WO | 2006125491 A1 | 11/2006 | |
| WO | WO-2014198432 A1 * | 12/2014 | ............. B60C 5/142 |

\* cited by examiner

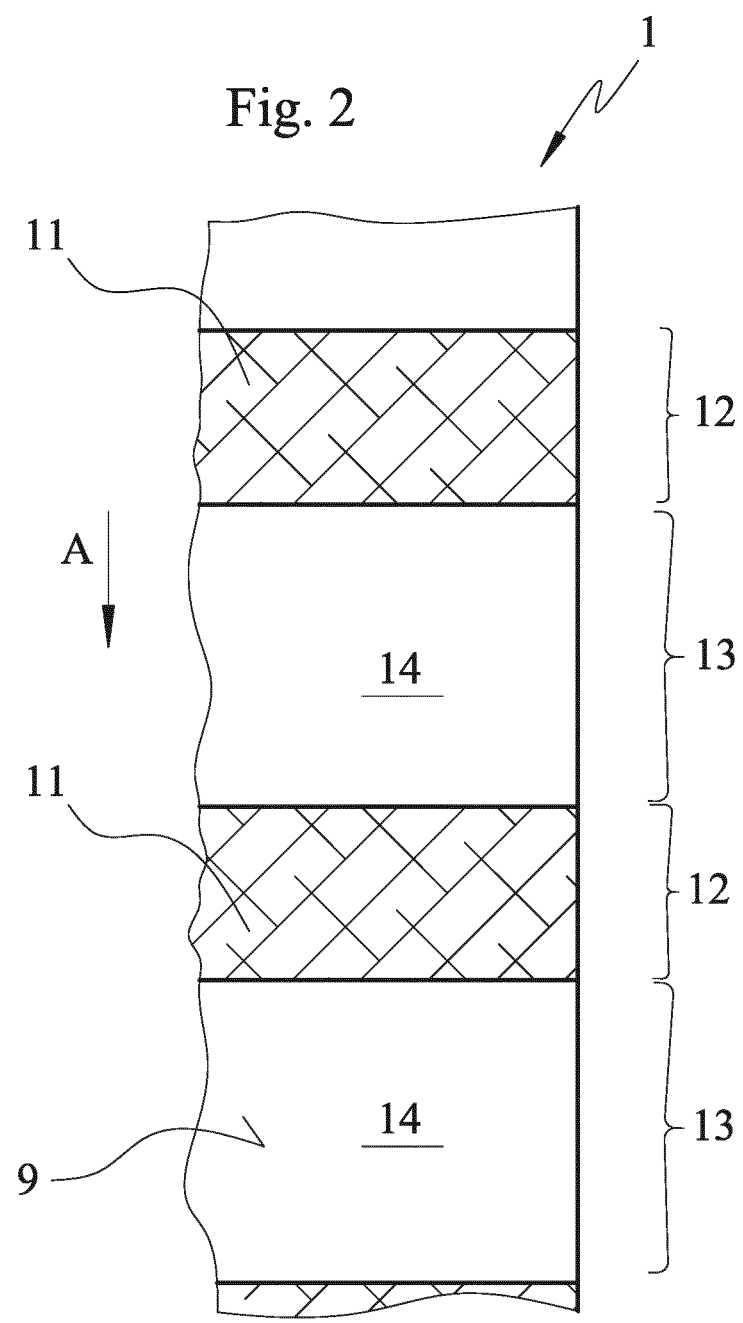

PNEUMATIC VEHICLE TYRES

The invention relates to a pneumatic vehicle tire as per the preamble of claim 1.

A pneumatic vehicle tire of the type in question here can be used either for bicycles or for passenger vehicles, agricultural vehicles and/or heavy goods vehicles, the vehicle wheels of which have been equipped with pneumatic vehicle tires, wherein the pneumatic vehicle tires have a structured tread having a profile suitably adapted to the expected ground surfaces and weather conditions. In a manner known per se, the tread of the pneumatic vehicle tire merges at either side into sidewalls, each end of which is formed by a tire bead. The tire bead serves for airtight fixing of that part of the pneumatic vehicle tire which is made up of different rubber mixtures with a wheel rim of the vehicle wheel to be equipped with the pneumatic vehicle tire. In a manner which is likewise known, the wheel rim, in a corresponding manner to the tire bead, has a wheel rim edge against which the tire bead bears in a sealing manner when the air cavity enclosed by the tubeless pneumatic vehicle tire and the wheel rim is filled with compressed air.

Modern pneumatic vehicle tires must nowadays not only transmit the kinetic energy generated by the motor vehicle to the ground surface in an optimal manner at all times under changing environmental conditions, but must increasingly also satisfy elevated demands with regard to comfort. In this context, a crucial role is also played by the rolling noise of the pneumatic vehicle tire which is generated by the vibration of the air when the latter is compressed as the pneumatic vehicle tire is compressed against the road surface. The rolling noise that arises in this way is transmitted from the pneumatic vehicle tire to the wheel hub, such that it ultimately passes through the steering system and the suspension arrangement into the passenger compartment. However, acoustic exposure to the rolling noise generated during driving is perceived as a nuisance not only within but also outside the motor vehicle, which is becoming increasingly significant in cities for example.

Rolling noise can be significantly reduced by means of technology which is already known and is in use in some motor vehicles. This involves using, as a sound-absorbing medium, an absorber which is arranged within the pneumatic vehicle tire and is, for example, a foam body which is cohesively mounted, i.e. with an adhesive for example, on the inside of the tread of the pneumatic vehicle tire. There are also known solutions in which the absorber is secured to the wheel rim of the vehicle wheel. The structure of an absorber executed as a foam body, which generally consists of polyurethane, is maintained even under extreme temperature variations. Polyurethanes are plastics or synthetic resins which form from the polyaddition reaction of dialcohols or polyols with polyisocyanates. Depending on the type of motor vehicle, the speed thereof and the road surface, it is possible by means of the aforementioned measures to achieve reductions in vehicle noise in the interior of the motor vehicle by up to 9 dB(A), with no restriction in either the driving characteristics or the performance, the load-bearing capacity or the speed achievable with the pneumatic vehicle tire as a result of the introduction of the absorber into the pneumatic vehicle tire.

Such a pneumatic vehicle tire of a vehicle wheel is known, for example, from DE 10 2007 028 932 A1. The document states that the absorber is secured within the pneumatic vehicle tire with a pre-applied, automatically sealing sealant with bonding on the inner surface of the pneumatic vehicle tire. The sealant used here, which is adhesive-bonded over the full area, is a polyurethane gel.

In addition, DE 198 06 953 C2 discloses a pneumatic vehicle tire suitable for a vehicle wheel and a method of producing a pneumatic vehicle tire of this kind, wherein the absorber, even before being applied on the inner surface of the pneumatic vehicle tire, is produced in a form suitable for the purpose by means of a foaming process and is then equipped with an additional, sound-absorbing structure on the side facing the inside of the pneumatic vehicle tire. The structure applied to the foamed material layer may in this case have a linear shape or an undulating shape, which are each suitable for realizing an enlarged surface, which additionally has a sound-absorbing action.

For the establishment of a cohesive bond between the inner surface of the pneumatic vehicle tire and the absorber, adhesion promoters are regularly used, and primarily adhesives are employed. What is important in the present context is that there has to date always been adhesive bonding over the full area between the absorber and inside of the pneumatic vehicle tire because the view is generally expressed that only full-area bonding can provide sufficient certainty against unwanted, automatic detachment of the absorber from the inner surface of the pneumatic vehicle tire. Moreover, it was regarded as the simplest solution in terms of manufacturing technology to provide the entire inner surface of the pneumatic vehicle tire with an adhesion promoter or adhesive and then to fix the absorber on the section of the inner surface intended for the purpose. It has now been found that, however, full-area bonding brings drawbacks with regard to the weight of the pneumatic vehicle tire and hence affects the driving properties of a vehicle wheel equipped with the pneumatic vehicle tire, even if this effect is comparatively small. Furthermore, the cost and inconvenience involved in preparation for the bonding and here especially the cost and inconvenience of cleaning to free the surfaces to be bonded of impurities is relatively high, and so a reduction here would be desirable. A particular difficulty in the manufacture of a pneumatic vehicle tire of this kind is that the sections comprising the adhesion promoter should be definable as exactly as possible, in order to be able to exactly predetermine the properties of the pneumatic vehicle tire.

It is an object of the invention to provide a pneumatic vehicle tire with an absorber suitable for sound absorption, in which the bonding between the absorber and pneumatic vehicle tire is optimized and saves weight to a maximum degree, and is simple to implement in terms of manufacturing technology.

This objective is achieved by the invention with the features of claim 1. Further configurations of the invention are the subject of the subsequent dependent claims.

A pneumatic vehicle tire having a profiled tread that merges at either side into sidewalls, the end of which is formed by a tire bead insertable in an airtight manner into a wheel rim of a vehicle wheel, wherein an absorber cohesively bonded to the inner surface of the pneumatic vehicle tire has been integrated into the pneumatic vehicle tire for sound absorption and the cohesive bond consists of an adhesion promoter applied between the absorber and the inner surface of the pneumatic vehicle tire, has been further developed in accordance with the invention in that the inner surface of the pneumatic vehicle tire has mutually alternating adhesion promoter sections and adhesion promoter-free sections, the adhesion promoter-free sections having been coated with a separating agent.

The solution of the invention of providing adhesive bonding not over the full area between the absorber and the inner surface of the pneumatic vehicle tire achieves multiple advantages at the same time. Thus, firstly, the saving of costly adhesive constitutes an economic benefit which additionally also leads to a reduction in the total weight of the pneumatic vehicle tire and hence also of the vehicle wheel equipped with the pneumatic vehicle tire, which ultimately also has a positive effect on the fuel consumption of the motor vehicle. Furthermore, manufacturing-related advantages also arise, because both the preparation of the surfaces to be bonded and the bonding operation as such are significantly simplified, such that a pneumatic vehicle tire equipped in such a way can be manufactured within a shorter time and hence produced more economically. The division into adhesion promoter sections and adhesion promoter-free sections additionally leads, by virtue of the separating agent applied in the region of the adhesion promoter-free sections in each case, to exactly predeterminable fixing of the absorber in the pneumatic vehicle tire. The separating agent serves here in a simple manner to avoid an adhesive bond between absorber and pneumatic vehicle tire in the above-defined sections.

In a first configuration of the invention, it is proposed that the adhesion promoter-free sections have or consist of, as separating agent between the inner surface of the pneumatic vehicle tire and the absorber, a film, a weave or a lubricant. Crucial aspects for the selection of the separating agent are firstly manufacturing-related aspects. Secondly, it is important that a substrate be created in the region of the separating agent where the adhesion promoter cannot create any cohesive bond between the inner surface of the pneumatic vehicle tire and the absorber. In other words, the separating agent has a surface structure that repels the adhesion promoter.

Furthermore, in a development of the invention, the adhesion promoter sections and the adhesion promoter-free sections are distributed homogeneously around the circumference of the inner surface of the pneumatic vehicle tire. In other words, the adhesion promoter is applied in a constantly recurring, identical pattern either to the inner surface of the pneumatic vehicle tire and/or to the surface of the absorber. The homogeneous application of the adhesion promoter and the separating agent even enables automated handling of this operation, which in turn reduces the manufacturing complexity for a pneumatic vehicle tire produced in this way.

As an alternative to this proposal, in another, very advantageous solution according to the invention, the adhesion promoter sections and the adhesion promoter-free sections have an inhomogeneous, varying distribution around the circumference of the inner surface of the pneumatic vehicle tire. In this method of application of the adhesion promoter and of the separating agent, no particular pattern or no particular sequence of the application to the inner surface of the pneumatic vehicle tire and/or to the corresponding surface of the absorber is envisaged. The adhesion promoter here can consequently be applied randomly or, in a manner corresponding to a preferred variant, a defined sequence of application of the adhesion promoter is envisaged, but there is a change in the profile of the adhesion promoter applied along the inner surface of the pneumatic vehicle tire or along the surface of the absorber. The regions that have not been provided with an adhesion promoter accordingly possess the separating agent.

Particularly advantageous absorbers have been found to be sound-absorbing materials such as foam, glass wool, rock wool, cork, Styropor (polystyrene), felt, nonwoven fabric or loop pile fabric. These materials are easy to process and can therefore be used in the manner of the invention without any problem.

The adhesion promoter used in the simplest case may be an adhesive, in which case the adhesion-mediating rubber mixtures or gels can likewise be used. An adhesion promoter of this kind may consequently, for example, be a polyurethane gel.

The invention will be discussed in detail hereinafter with reference to the appended drawings. The working examples shown do not constitute a restriction to the variants described, but serve merely for elucidation of a principle of the invention.

Identical or similar components are always denoted by the same reference designations. To be able to illustrate the function according to the invention, the figures merely show highly simplified diagrammatic illustrations, in which components not essential to the invention have been omitted. However, this does not mean that such components are not present in a solution according to the invention.

The figures show:
FIG. 1: a fully mounted vehicle wheel in cross section and
FIG. 2: a section from a view of an inner surface of another example of the execution of a pneumatic vehicle tire prior to the application of the absorber.

FIG. 1 shows, by way of example, a fully mounted vehicle tire 8 in cross section. The latter is made up of a pneumatic vehicle tire 1 and a wheel rim 7 which holds the pneumatic vehicle tire 1. The pneumatic vehicle tire 1 itself is composed of a profiled tread 2, the profile of which is merely indicated in the illustration in FIG. 1 by multiple groove-like depressions. Below said tread 2, the pneumatic vehicle tire 1 has multiple belt plies 18 which, in FIG. 1, are likewise illustrated merely by way of indication. On either side of the tread 2, the pneumatic vehicle tire 1 also merges into one sidewall 3 and 4 in each case, the lower end of which is formed in each case by a tire bead 5 and 6. Each tire bead 5, 6 is composed of a bead core 22, which merges into a core profile 21 which is encased with a rubber material. The tire beads 5, 6 of the pneumatic vehicle tire 1 form a seal with respect to the surroundings, such that said tire beads 5, 6 bear in air-tight fashion against a wheel-rim edge 17 of the wheel rim 7. The pneumatic vehicle tire 1 and the wheel rim 7 thus jointly surround an air cavity 24, which is filled with compressed air via the valve 15, inserted into a valve shank 16, of the vehicle wheel 8. The sidewalls 3, 4 of the pneumatic vehicle tire 1 are, in a manner known per se, made up of multiple plies, and thus form a complex system for stabilizing the pneumatic vehicle tire 1. Thus, on the inside of each sidewall 3, 4, there is firstly a reinforcement profile 19, which is adjoined in the direction of the outer side of each sidewall 3, 4 by a carcass 20, which in turn is embedded into a rubber layer that is otherwise unspecified in FIG. 1. Furthermore, the sidewall may comprise additional individual plies, which will however not be discussed in any more detail here.

The FIG. 1 shows the special feature of the invention, which is that there is an absorber 10 arranged on the inner surface 9, which is situated opposite the tread 2, of the pneumatic vehicle tire 1, and the free surface area 23 of which faces the air cavity 24. This absorber 10, having a multitude of pores 25 of different size as a result of the foaming operation, is cohesively bonded to the inner surface 9 of the pneumatic vehicle tire 1 using an adhesion promoter, which in the present context is an adhesive. As indicated by the representation in FIG. 1, the adhesion promoter 11 in the present case has multiple interruptions and, in the example, is applied in circumferential direction of the pneumatic vehicle tire 1 in linear form to the inner surface 9 of the pneumatic vehicle tire 1 before the absorber 10 has been applied to the inner surface 9 with a corresponding surface. As a result, around the inner surface 9 of the pneumatic vehicle tire 1, a multitude of adhesion promoter sections 12 equidistant from one another are formed, between which an adhesion promoter-free section 13 runs in each case. Every adhesion promoter-free section 13 is provided with a separating agent 14, such that there is no means of adhesion for the adhesion promoter 11 in these sections. By virtue of the use of the separating agent 14, consequently, the profile of the adhesion promoter 11 along the adhesion promoter sections 12 can be defined very exactly.

FIG. 2 shows a section from a view of the inner surface 9 of a pneumatic vehicle tire 1, with the circumferential direction of the pneumatic vehicle tire 1 symbolized by the arrow A. Contrary to the representation and the description in connection with FIG. 1, in this variant, multiple adhesion promoter sections 12 have been applied to the inner surface 9 to the inner surface 9 of the pneumatic vehicle tire 1 in the direction transverse to the circumferential direction A. The adhesion promoter sections 12 in this example are equidistant from one another, and this distance is formed in each case by an adhesion promoter-free section 13. In this adhesion promoter-free section 13, a separating agent 14 has been applied beforehand, and so there is no means here for the adhesion promoter 11 to establish a cohesive bond between the absorber 10 and the inner surface 9 of the pneumatic vehicle tire 1. The separating agent 14 used in the present context was a lubricant.

LIST OF REFERENCE NUMERALS

1 Pneumatic vehicle tire
2 Tread
3 Sidewall
4 Sidewall
5 Tire bead
6 Tire bead
7 Wheel rim
8 Vehicle wheel
9 Inner surface
10 Absorber
11 Adhesion promoter (adhesive)
12 Adhesion promoter section
13 Adhesion promoter-free section
14 Separating agent
15 Valve
16 Valve shank
17 Wheel rim edge
18 Belt plies
19 Reinforcing profile
20 Carcass
21 Core profile
22 Bead core
23 Free surface area (of the absorber)
24 Air cavity
25 Pores

The invention claimed is:

1. A pneumatic vehicle tire comprising a profiled tread that merges at either side into sidewalls, the profiled tread comprising ends formed by a tire bead which is insertable in an airtight manner into a wheel rim of a vehicle wheel, wherein an absorber cohesively bonded to an inner surface of the pneumatic vehicle tire has been integrated into the pneumatic vehicle tire for sound absorption, and wherein the cohesive bond consists of an adhesion promoter applied between the absorber and the inner surface of the pneumatic vehicle tire;
   wherein the inner surface of the pneumatic vehicle tire has mutually alternating adhesion promoter sections applied in a circumferential direction of the pneumatic vehicle tire in linear form, and adhesion promoter-free sections parallel to the adhesion promoter sections, and wherein the adhesion promoter-free sections are provided with a separating agent such that there is no adhesion promoter in the adhesion promoter-free sections;
   wherein in the adhesion promoter sections only the adhesion promoter is present between the absorber and the inner surface of the pneumatic vehicle tire; and
   wherein the adhesion promoter-free sections comprise, as a separating agent between the inner surface of the pneumatic vehicle tire and the absorber, a weave.

2. The pneumatic vehicle tire as claimed in claim 1, wherein the adhesion promoter sections and the adhesion promoter-free sections have a homogeneously repeating distribution around the circumference of the inner surface of the pneumatic vehicle tire.

3. The pneumatic vehicle tire as claimed in claim 1, wherein the adhesion promoter sections and the adhesion promoter-free sections are distributed homogeneously around the circumference of the inner surface of the pneumatic vehicle tire, and wherein the adhesion promoter is applied in a constantly recurring, identical pattern to the surface of the absorber.

4. The pneumatic vehicle tire as claimed in claim 1, wherein the absorber comprises a sound-absorbing material, such as foam, glass wool, rock wool, cork, Styropor (polystirene), felt, nonwoven fabric or loop pile fabric.

5. The pneumatic vehicle tire as claimed in claim 1, wherein the adhesion promoter is an adhesive.

6. The pneumatic vehicle tire as claimed in claim 1, wherein the adhesion promoter is a polyurethane gel.

7. A pneumatic vehicle tire comprising a profiled tread that merges at either side into sidewalls, the profiled tread comprising ends formed by a tire bead which is insertable in an airtight manner into a wheel rim of a vehicle wheel, wherein an absorber cohesively bonded to an inner surface of the pneumatic vehicle tire has been integrated into the pneumatic vehicle tire for sound absorption, and wherein the cohesive bond consists of an adhesion promoter applied between the absorber and the inner surface of the pneumatic vehicle tire;
   wherein the inner surface of the pneumatic vehicle tire has mutually alternating adhesion promoter sections applied in a circumferential direction of the pneumatic vehicle tire in linear form, and adhesion promoter-free sections parallel to the adhesion promoter sections, wherein the adhesion promoter-free sections are provided with a separating agent such that there is no adhesion promoter in the adhesion promoter-free sections;
   wherein in the adhesion promoter sections only the adhesion promoter is present between the absorber and the inner surface of the pneumatic vehicle tire;
   wherein the absorber comprises a sound-absorbing material, such as foam, glass wool, rock wool, cork, Styropor (polystirene), felt, nonwoven fabric or loop pile fabric; and
   wherein the adhesion promoter-free sections comprise, as a separating agent between the inner surface of the pneumatic vehicle tire and the absorber, a weave.

8. The pneumatic vehicle tire as claimed in claim 7, wherein the adhesion promoter sections and the adhesion promoter-free sections have a homogeneously repeating distribution around the circumference of the inner surface of the pneumatic vehicle tire.

9. The pneumatic vehicle tire as claimed in claim 7, wherein the adhesion promoter sections are distributed homogeneously around the circumference of the inner surface of the pneumatic vehicle tire, and wherein the adhesion promoter is applied in a constantly recurring, identical pattern to the surface of the absorber.

10. The pneumatic vehicle tire as claimed in claim 7, wherein the adhesion promoter is an adhesive.

11. The pneumatic vehicle tire as claimed in claim 7, wherein the adhesion promoter is a polyurethane gel.

* * * * *